United States Patent [19]
Godin et al.

[11] Patent Number: 5,527,174
[45] Date of Patent: Jun. 18, 1996

[54] APPARATUS AND METHOD OF LOADING PIECES INTO MOULD OF INJECTION MOULDING APPARATUS AND UNLOADING MOULDED COMPOSITE ARTICLE

[75] Inventors: Edmond J. Godin; John Fawcett, both of London, Canada

[73] Assignee: Falcon Plastics Inc., London, Canada

[21] Appl. No.: 355,860

[22] Filed: Dec. 14, 1994

[30] Foreign Application Priority Data

Apr. 29, 1994 [CA] Canada ................... 2122507

[51] Int. Cl.⁶ .................... B29C 45/14; B29C 45/76
[52] U.S. Cl. .................... 425/126.1; 425/136; 425/556; 425/436 R; 425/436 RM; 264/40.1
[58] Field of Search ................... 425/126.1, 136, 425/139, 165, 436 R, 436 RM, 556; 264/40.1, 259

[56] References Cited

U.S. PATENT DOCUMENTS

| | | | |
|---|---|---|---|
| 3,827,856 | 8/1974 | Van de Walker et al. | 425/126.1 |
| 3,973,888 | 8/1976 | Hehl | 425/125 |
| 4,204,824 | 5/1980 | Paradis. | |
| 4,368,018 | 1/1983 | Rees et al. | |
| 4,574,474 | 3/1986 | Langham | 425/136 |
| 4,576,566 | 3/1986 | Herman | 425/126.1 |
| 5,288,698 | 2/1994 | Banjo et al. | 425/126.1 |
| 5,297,897 | 3/1994 | Venrooij et al. | 425/126.1 |

FOREIGN PATENT DOCUMENTS

| | | |
|---|---|---|
| 696993 | 11/1964 | Canada. |
| 880980 | 9/1971 | Canada. |
| 923268 | 3/1973 | Canada. |
| 1128269 | 7/1982 | Canada. |
| 1260216 | 9/1989 | Canada. |
| 2074940 | 8/1991 | Canada. |
| 2081895 | 12/1991 | Canada. |
| 2076161 | 4/1993 | Canada. |

Primary Examiner—Khanh P. Nguyen
Attorney, Agent, or Firm—Stanley E. Johnson

[57] ABSTRACT

An insert moulding system in which a movably mounted tool head loads inserts into the mould and unloads moulded articles from the mould. The tool head has sensors and an article position and retaining structure on a load face thereof for each of a number of insert pieces to be incorporated in the moulded articles. The operation is computer controlled and the sensors on the tool head sense at least one characteristic of each insert piece thereon, e.g. flatness and generate a signal in response to such characteristic being outside of specification which renders inoperative the moulding process until the offending insert piece is replaced by one meeting specification. Position locators have inter-engageable portions respectively on the tool head and the fixed in position mould positively to locate the movable head and fixed mould in a predetermined fixed relation relative to one another during cycle after cycle of operation providing precision injection moulding. The movably mounted tool head has a center plate with a load plate and unload plate respectively on opposite sides thereof. The load and unload plates are interconnected by a pneumatic piston cylinder unit controllably actuated to move such plates in directions toward and away from one another.

24 Claims, 10 Drawing Sheets

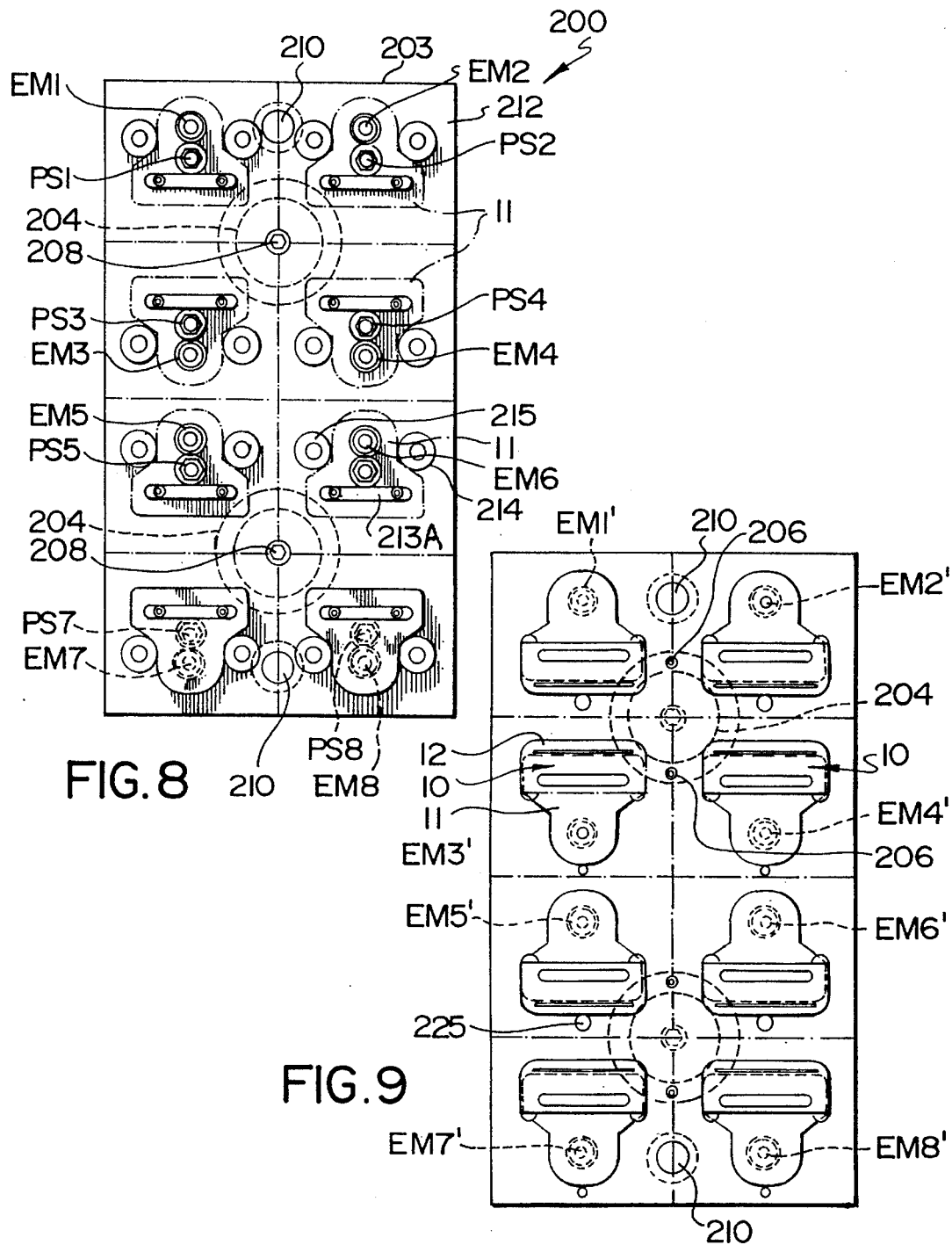

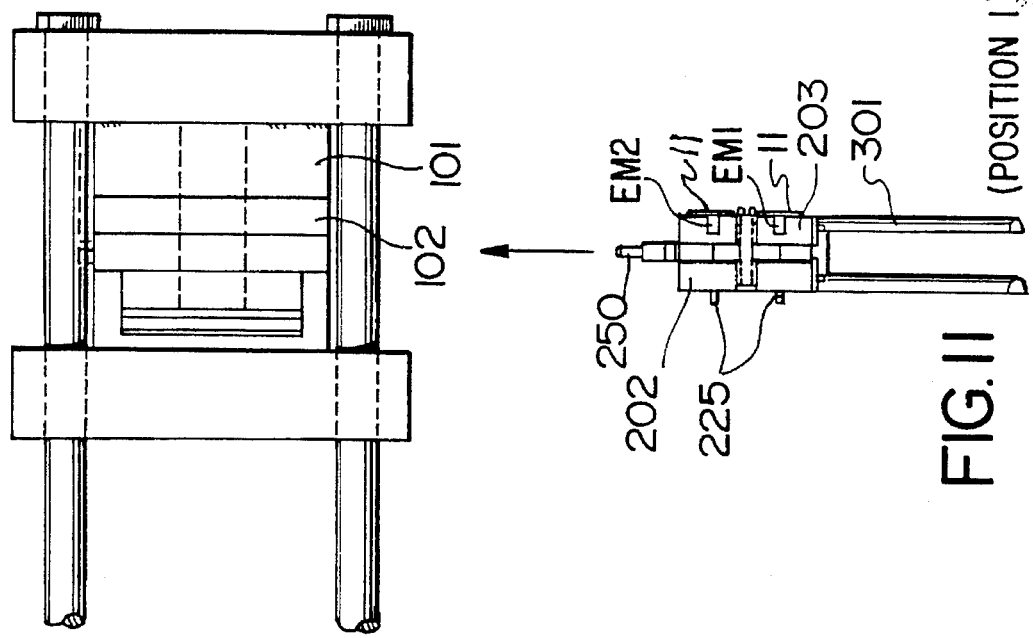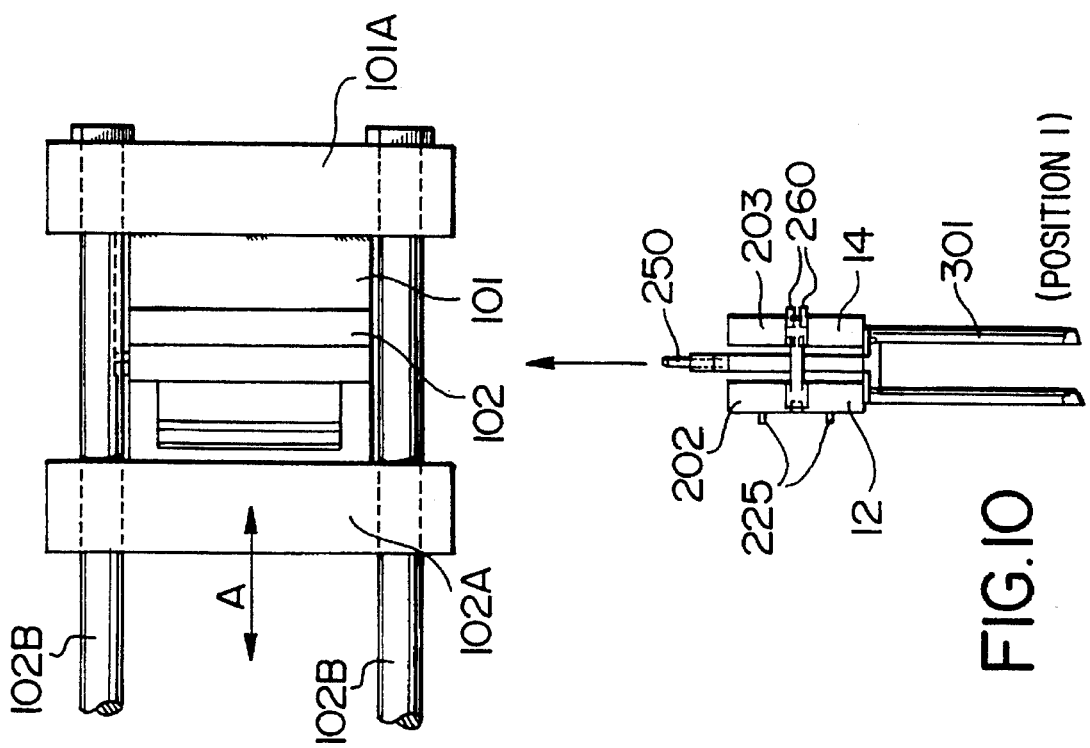

APPARATUS AND METHOD OF LOADING PIECES INTO MOULD OF INJECTION MOULDING APPARATUS AND UNLOADING MOULDED COMPOSITE ARTICLE

FIELD OF THE INVENTION

This invention relates to injection moulding and more particularly to an improved apparatus and method of loading items to be incorporated in the moulding process. The invention also relates to unloading the moulded articles that incorporate the pieces loaded in the previous cycle and in the preferred form the loading and unloading take place essentially at the same time.

BACKGROUND OF THE INVENTION

Synthetic plastics or rubbers are usually moulded under pressure. In transfer moulding a first large hydraulic cylinder usually closes the die or mould to hold the joint line tight against splash and then the charge is forced into the cavity by means of a smaller hydraulic cylinder. Injection moulding makes this process automatic by adding a hopper to maintain a supply of mouldable material, a control injection and a meter to feed the correct amount of mouldable material, a control heating zone to bring the charge up to temperature before it is injected into the mould cavities, a moulded article ejecting means and automatic cycle timing.

The injection moulding process is often used to mould or bond a plastics material (or any other material suitable for injection moulding) onto another article and this sometimes is referred to as insert injection moulding. The referred to another article is the insert which must be loaded into the split open mould before being closed. The insert is retained in the mould cavity and the mould closed following which the material is injected into the mould. The mould is then opened and the moulded article unloaded.

Loading an insert into a mould half and unloading an injection moulded composite article from the other mould half is known from the teachings of U.S. Pat. No. 4,368,018 issued Jan. 11, 1983 naming Herbert Reese and Klaus B. Fritzsche as inventors. This patent discloses a movable transport unit controlled by particular mechanical apparatus to deliver a single insert into one mould half and the patentees have indicated this loading can be done while "concurrently extracting a moulded workpiece from the other opposite mould portion". Movement of the transport unit is synchronized with movement of the mould half to an open and closed mould position. Accuracy and precision is not one of the patentees' concerns nor is the simultaneous moulding of multiple pieces nor is there any suggestion for checking the insert for accuracy before being loaded.

A process and device for controlling the movements of an injection mould and a handling device are disclosed in International PCT/DE/9100221 published August 1991 under WO91/11314 (Canadian National Phase Application Serial No. 2,074,940).

Insert injection moulding is also disclosed in Canadian Patent 923,268 issued Mar. 27, 1973 to E.S.B. Incorporated naming Ronald L. Daggett as inventor. This patent discloses utilizing magnets (permanent or electromagnets) to hold the insert in position in the mould and also a locator that engages and positions the insert.

None of the foregoing references disclose the problems associated with high output production while at the same time accomplishing precision insert moulding.

SUMMARY OF THE INVENTION

The present invention will be described with reference to the manufacture of seat belt tongues but is applicable to other articles. In the present apparatus a number of stamped metal plates are loaded into the open mould after which the mould is closed and by injection moulding a plastics material is added to a part of each plate. The mould is then opened and the moulded articles ejected. A tool head, mounted on a movable carriage, is used to load the pieces and at the same time unload the moulded pieces. The mould in an operable set up accommodates eight metal plates for each cycle of operation.

Seat belt tongues, because of their function to protect occupants in a motor vehicle, must be manufactured precisely with little or no margin of error. This means that each of the eight metal plates must be manufactured with little tolerance for error and each plate must be precisely located in the mould.

The metal plates could be hand loaded one by one into the mould while in its open position. That however would be a slow, time consuming, labour intensive process and imperfections are not visually detectable except perhaps in extreme cases.

A principle object of the invention therefore is to mechanize at least the loading of the stamped metal pieces into the mould with precision consistently cycle after cycle.

A further principle object of the present invention is to consistently, cycle after cycle, position accurately a plurality of inserts in a mould and do so rapidly for a high rate of production of moulded articles.

A still further object of the present invention is to check each insert for accuracy of at least one selected characteristic thereof prior to being loaded into the mould.

A still further principle object of the present invention is to load insert pieces consistently with accuracy and at the same time unload the moulded articles from the previous cycle incorporating the inserts which had been placed in a mould in the previous cycle.

While the invention herein is described with reference to the manufacture of seat belt tongues it will be obvious the apparatus and process of the present invention is applicable to any insert injection moulding process where one or more insert pieces are loaded into the mould to be incorporated partially or fully into a plastics material (or any other material suitable for injection moulding).

Broadly speaking in accordance with the present invention there is provided apparatus for loading one or more inserts into a mould to be incorporated in a moulded article in which means are provided to guide and precisely position the loading apparatus relative to the mould portions. A number of inserts, to be incorporated in the final moulded articles are loaded on to a tool head of a robot. This loading may be done manually and individually or by a mechanical process. The robot is moved from this first loading position in which it is remote from the mould, to a second transfer position wherein it is disposed between the mould sections of the open mould.

In the case of the seat belt tongues eight stamped metal plates are positioned on one outer face of the tool head and then transferred therefrom onto one mould section. The pieces are suitably located during the transfer and suitably retained for incorporation in the plastics material. The eight completed moulded articles, i.e. seat belt tongues from the previous moulding cycle are retained on the other half of the mould so as to be in face to face relation with another outer face on the side of the tool head opposite said one face. The moulded tongues are transferred from the mould section on which they are retained onto said another outside face of the head simultaneously with the loading of the stamped metal plates from said one face of the head onto the said one mould section.

This loading and unloading simultaneously considerably speeds up the injection moulding process and reduces the amount of labour involved. Even though the stamped metal pieces are manually loaded onto the head it is much faster because with the tool head in a suitable location it is readily accessed by the individual for loading. Also hand loading the stamped metal pieces is no more time consuming than the time required for the moulding portion of the cycle.

As previously mentioned the tool head is mounted on a carriage that moves. The tool head is mounted on the free outer end of an L-shaped arm that depends from a carriage and that carriage is controllably reciprocated along a track. The limits of movement are from one to the other of a first position where the head is remote from the mould (i.e. at a location where the stamped metal plates are loaded onto the one outer face of the head) to a second position where the head is disposed between the split apart, i.e. open mould. In this second position the two outer faces on the head are in face-to-face relation with the respective cavity portions in the mould sections. For a high rate of production rapid movement of the head from one to the other of the mentioned first and second positions is desired. This rapid movement is facilitated by reducing the amount of mass of the arm, carriage and head and by utilizing light weight materials. This, however, adversely affects the precision with which the head may be located time after time relative to the fixed mould half. This precision of relative positioning is required for precise injection moulding and applicant's invention addresses this by providing locator means for the head which engages the head and holds the same in a predetermined fixed location in its second position. These locator means are securely fixed relative to the fixed mould half.

The mould head, as will become clear from the detailed description to follow, has a central plate that is carried by the L-shaped arm and on that central plate there are two outer plates that are movable toward and away from the central plate. The two plates are referred to as the load plate and the unload plate. The outer face of the load plate carries the stamped metal pieces for placement in the one mould half and in order to precisely locate the plates in such mould half it is necessary there be consistency in the relative positioning of the load plate relative to the adjacent fixed mould portion. Means are provided on the mould head to accomplish this fixed relative positioning.

For consistency of the moulded parts it is essential there be consistency in at least certain characteristics of the insert. In the case of stamped metal plates for seat belt tongues it is essential the shape of at least a selected portion of the metal stampings fall within certain limits and the flatness must also be within a predetermined limit.

In accordance with the present invention sensing means are provided to determine a selected characteristic of each insert piece on the mould head before being loaded into the mould and if any insert piece is outside a predetermined limit of that characteristic it renders the further portion of the cycle inoperative. Additionally means is preferably provided visually to indicate the defective piece or pieces on the mould head. In the present case of stamped metal pieces for the seat belt tongues there can be a variance in the flatness from the stamping operation and that flatness must fall within predetermined limits. The sensor means determines whether the flatness meets specification and if not the injection moulding process is by suitable signal disabled. The sensing means may be varied for sensitivity for example by selectively adjustably mounting the same on the load head.

The loading and unloading is facilitated by magnets in predetermined locations and which are suitably and timely activated to hold the stamped metal plates to be loaded and the moulded tongues when they have been released from the mould.

In keeping with the foregoing there is particularly provided in accordance with the present invention apparatus for loading at least one insert into the mould of an injection moulding machine, said moulding machine having first and second mould parts movable toward one another to a closed position in which position they together provide a cavity therein for moulding and away from one another in spaced apart relation relative one another to receive said at least one insert to be incorporated in the moulding process, said apparatus comprising a carriage movable from one position to the other of respective first and second positions that are spaced from one another; means guiding such carriage during its movement from said one position to the other along a predetermined path; an article handling head mounted on said carriage, said head in said carriage first position, being remote from said mould sections to permit loading said at least one insert thereon and in said carriage second position being located between the spaced apart mould sections, said head having a first outer face located in face-to-face relation with respect to the cavity portion of one mould section when said carriage is in said second position; means releasably retaining said one or more inserts, to be incorporated in the moulding process, on said first face and means to transfer said pieces from said first head surface to said one mould section and positioning means to positively locate said first head surface relative to the mould section adjacent thereto when said head is in its said second position, said positioning means including inter-engaging portions respectively on said head and the fixed mould structure.

In the preferred embodiment the tool head has a second outer face on the side of said head opposite to that of said first outerface and so disposed as to be in opposing relation with respect to the cavity portion of the other mould section. Transfer means transfers the moulded articles to said second head surface while pieces are being transferred from said first face onto said first mould section.

LIST OF DRAWINGS

The invention is illustrated by way of example in the accompanying drawings wherein:

FIG. 8 is a right hand side elevational view of FIG. 7 but with metal stampings shown on and in outline on the load plate;

FIG. 9 is a left hand side elevational view of FIG. 7 showing the face of the unload plate with seat belt tongues resulting from the insert moulding;

FIGS. 10 to 15 are top plan views showing the relative disposition of the carriage head of the present invention and the mould sections during different phases of a single moulding cycle.

DESCRIPTION OF PREFERRED EMBODIMENT

Figure 1:
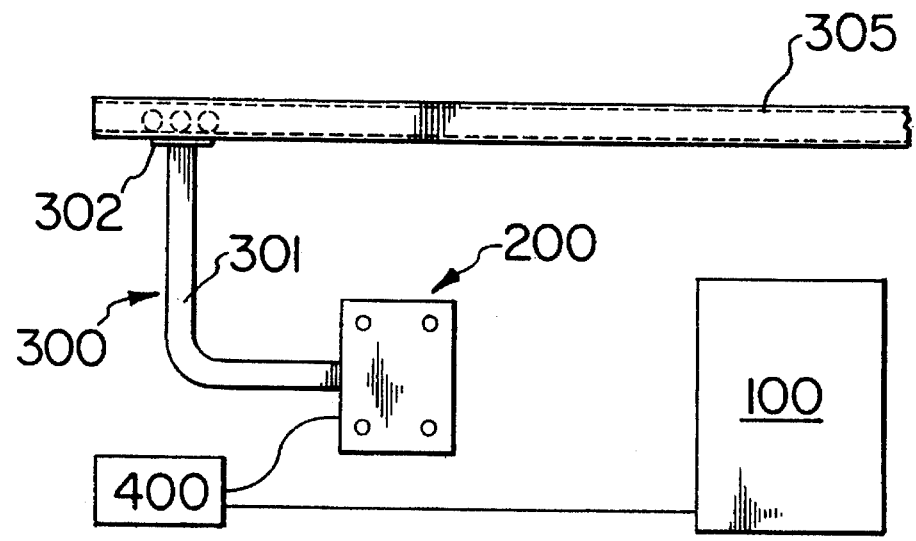
FIG. 1 is a diagrammatic right hand side elevational view illustrating an injection moulding system incorporating apparatus of the present invention.
Figure 2:
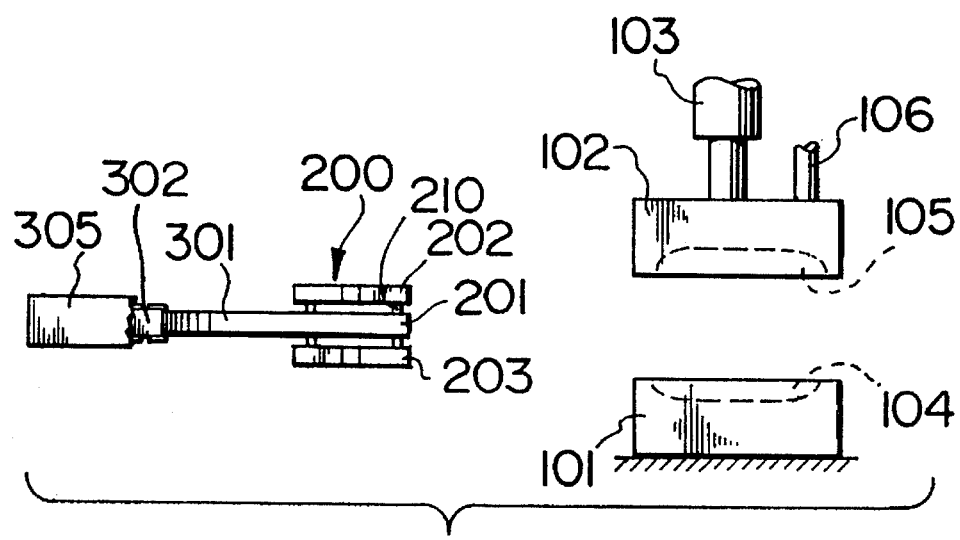
FIG. 2 is a partial top plan view of FIG. 1.

FIGS. 1 and 2 are a simplified diagrammatic illustration of an insert injection moulding system and apparatus of the present invention. The system comprises a conventional injection moulding apparatus 100, a tool head 200 carried by a movable carriage system 300 and a system control means 400. The moulding apparatus 100 includes a first fixed in position mould section 101 and a second mould section 102 movable toward and away from the fixed mould section 101 by way of an actuator 103. Mould sections 101 and 102 have respective cavity portions 104 and 105.

In the moulding process pieces to be incorporated in the moulded articles are placed in the cavity 104 of mould section 101 by the tool head 200 when the mould sections are open and the mould head is located therebetween. After the mould head moves to a position remote from the mould sections actuator 103 thereafter brings the mould sections 101 and 102 into a closed position and the moulding material is then forced into the mould cavity. When the moulding has been completed the mould sections are moved to their open position at which time the moulded articles are retained on the mould section 102 and ejected therefrom by, for example, a second actuator 106 and new pieces are loaded into cavity 104. Actuators 103 and 106 may be pneumatic, hydraulic or the like. The control system 400 includes sensors, locators, actuators and computers to control the operation including detecting imperfections of the inserts and disabling the system operation should the detected imperfection be outside predetermined limits.

Figure 7:
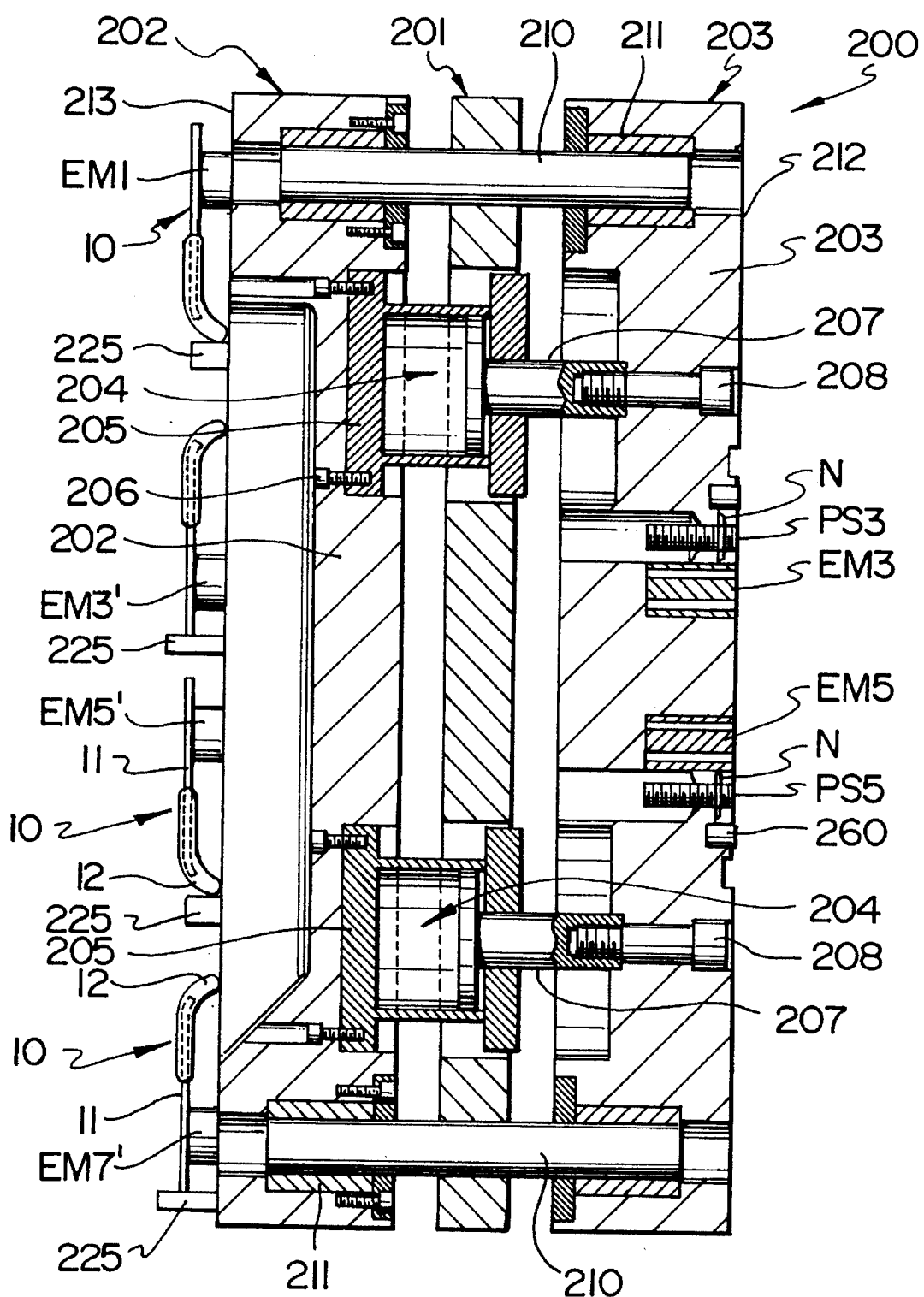
FIG. 7 is a sectional view taken along line 7—7 of FIG. 4 but with the mould sections omitted and on a larger scale.
Figure 13:
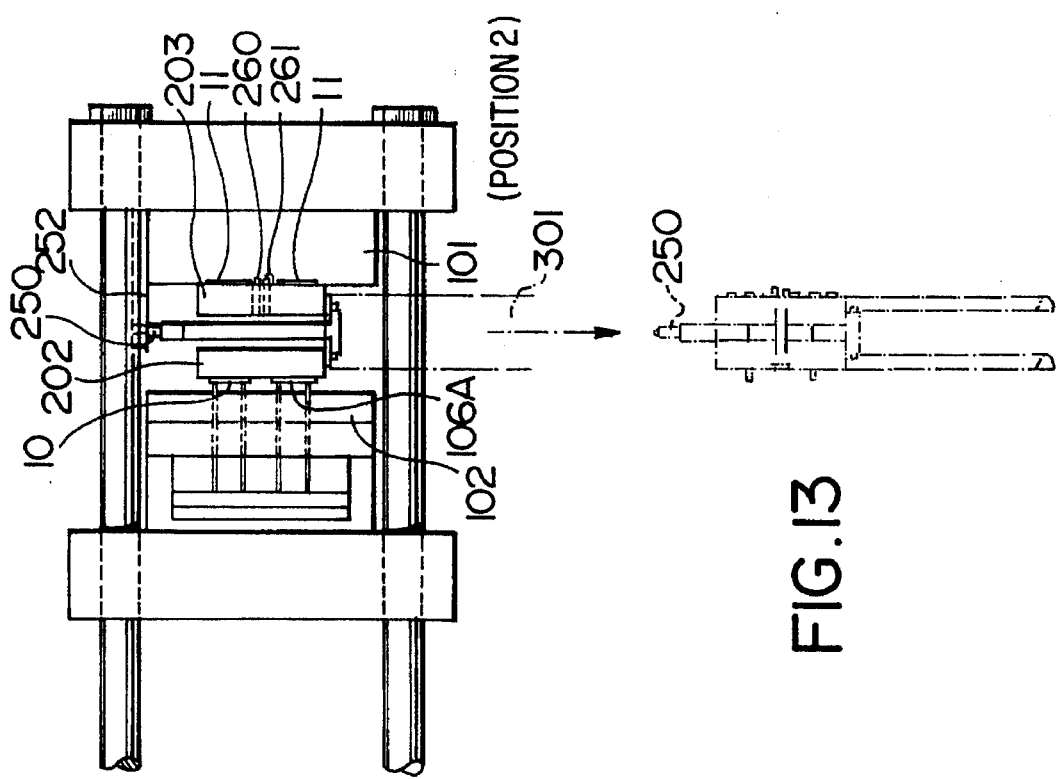

The invention herein as previously mentioned, is described with respect to the manufacture of seat belt tongues. Eight seat belt tongues 10 are shown in FIGS. 7 and 9 on one face of the tool head after the mould process has taken place and each consists of a metal plate 11 having a portion thereof embedded in a plastics material 12. The moulded parts 10 in FIGS. 7 and 9 are on the unload side of the tool head 200. In FIG. 8, the lower two of eight metal plates 11 are shown on the load side of the tool head prior to being loaded into the mould cavity 104 and the other six are shown in broken line.

The tool head 200 is mounted on the free outer end of an L shaped arm 301 that depends from a carriage 302 of the carriage system 300. The carriage 302 runs on linear bearings 303 (see FIG. 5) running on a guide rail 303A supported by bearing blocks 304 on a horizontal rail 305. The rail 305 is mounted via I beams 305A on rigid fixed structure of the moulding apparatus 100. The carriage is moved linearly back and forth on the rail 305 by an actuator 306 which may be hydraulic or pneumatic. The carriage moves the tool head from one to the other of first and second positions (see FIGS. 10 and 12) respectively where it is remote from the mould sections and between the mould sections.

The carriage system 300 effectively provides means for moving the tool head 200 from one position to another of respective first and second positions along a preselected and predetermined path. At its first position where it is remote from the mould sections the load face of the tool head is at a suitable and convenient location for an operator to place pieces thereon to be incorporated in the moulded article. In the other of said two positions the tool head is disposed so that the pieces on the tool head face are closely adjacent one of the mould sections so as to be readily transferred therefrom to that mould section. In the preferred embodiment, while a tool head is in the latter position, the moulded articles are transferred from the other mould section onto an opposite face of the tool head referred to herein as the unload face.

The carriage or other transport means moves the tool head horizontally but in some instances it perhaps could be vertical or a combination of vertical and horizontal.

The tool head 200 and various features thereof is more clearly seen from FIGS. 5 to 9. Referring to FIG. 7 the tool head 200 comprises a centre plate 201 which is secured to and projects outwardly from the outer end of the arm 300. The center plate 201 is sandwiched between an unload plate 202 and a load plate 203 these plates being movably mounted toward and away from the center plate by a pair of pneumatic piston cylinder actuators 204. The cylinder portion 205 of the actuator is secured, for example by studs 206 to the unload plate 202 and the piston rod portion 207 is anchored by way of a stud 208 to the load plate 203. A pair of guide pins 210 are securely fixed to and project from the center plate 201. The plates 202 and 203 are journalled to slide on these pins by way of bearings 211. The pair of pneumatic cylinders 204 (if desired these could be replaced by a single pneumatic cylinder) push the plates 202 and 203 away from one another and pull the plates toward one another. This movement is controlled by the control system 400 to be described herein after. The pair of plates 202 and 203 float relative to the center plate 201. When the plates 202 and 203 are moved together they touch against the opposite faces of plate 201 in which position the three plates are sandwiched together. Actuation of the cylinders 204 to drive the plates 202 and 203 away from the center plate causes the plates 202 and 203 to move relative to one another. Floating of the pair of plates on plate 201 is an attribute which will be appreciated more fully in description to follow.

The load plate 203 has an outer face 212 which is referred to herein as the load face of the tool head. The unload plate 202 has an outer face 213 referred to herein as the unload face of the tool head. Faces 212 and 213 are respective opposite faces of the tool head.

The load face 212 is illustrated in FIG. 8 and has eight sets of insert locators projecting therefrom. There is one set of locators for each of the eight stamped metal plates for the seat belt tongues. Each set of locators includes a rectangular projection 213 that fits into a correspondingly shaped slot in the metal plate 11 and a pair of buttons designated respectively 214 and 215. Additionally there is an insert retaining electromagnet for each of the respective inserts and these are designated respectively EM1 through to EM8 inclusive.

The insert locators 213, 214 and 215 precisely position each of the metal plates 11 on the face 212 and the metal plates 11 are retained thereon by activation of the electromagnet associated therewith.

Means is also provided on the load plate 203 to detect for accuracy a selected characteristic of the insert. In the case of manufacturing seat belt tongues the selected characteristic is the flatness of each of the respective plates 11. Since these plates 11 are formed by a metal stamping operation the flatness may not necessarily fall within the limits of tolerance dictated for use by the requirements for seat belts. FIG. 8 illustrates 8 proximity sensors designated respectively PS1, PS2, PS3, PS4, PS5, PS6, PS7 and PS8. These sensors are located at a suitable location relative to the respective inserts 11 and are adjustably mounted on the plate 203 as for example by way of an adjusting nut N (see FIG. 7). The adjustment permits variously adjusting the sensor for sensitivity moving the sensor toward and away from the insert that is on the face 212. The face 212 is flat and the sensors determine whether respective ones of the eight stamped metal plates are within specification relative to the flatness. In the event an insert piece is not within specification the sensor will cause a signal to be generated and that signal, through the control system 400, will prevent further moulding until the offending article has been replaced with one that meets specification. This contributes toward precision insert moulding.

The protrusions 213, 214 and 215 on the unload face 212 provide an exact positioning for the inserts on such face. The proximity sensors PS1 etc. to PS8 determines whether the stamped metal plate is sufficiently accurate as to meet the predetermined specification. These features contribute to the precisioned injection moulding of the present invention.

In order to insert injection mould with precision cycle after cycle, repetitively and rapidly movement of the loading head 200 from one to the other of its first and second positions should be rapid and to accomplish this the carriage system is manufactured to be as light as possible. As seen from FIG. 3 the L-shaped arm 301 has cut-outs and from FIG. 5 it will be seen it is of plate construction. The bearing blocks 304A supporting the linear bearings 303 are preferably adjustable minimizing any looseness there might be and with the ability to adjust for wear as it occurs.

Figure 6:
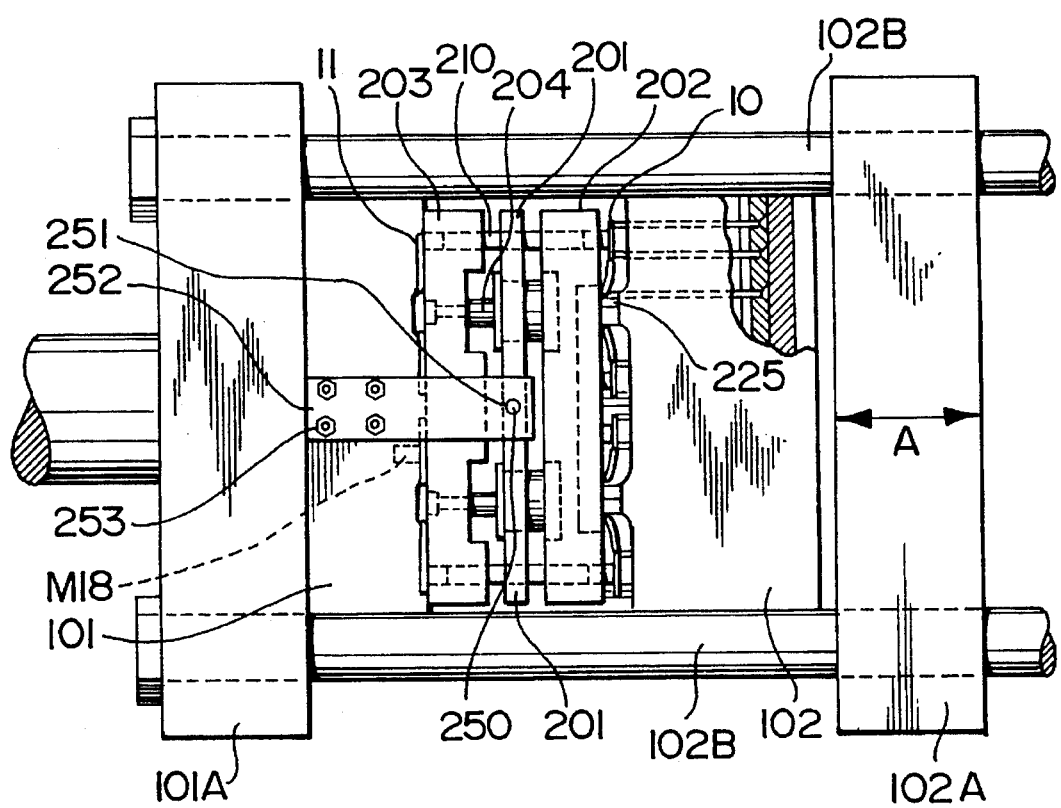
FIG. 6 is a rear elevational view taken essentially along line 6—6 of FIG. 4 but on a larger scale.

A further feature of the present invention is to provide guide and positioning means for the head 200 so as to define a predetermined relationship of its position relative to the fixed mould section when the head is in its second position. One embodiment of this guide and positioning means is illustrated consisting of a pin or dowel 250 projecting from the rear edge of the tool head center plate 201. This pin 250 fits into an aperture or recess 251 in a plate 252 rigidly secured to structure mounting the fixed in position mould section 101. The securement for this is shown in FIG. 6 as consisting of a plurality of studs 253. The locating pin 250 is clearly seen in FIG. 10 as projecting forwardly from the tool head center plate 201 and in FIG. 12 this pin is shown as projecting into an aperture 251 in the plate 252.

FIGS. 10 to 15 are diagrammatic plan views illustrating the relative positioning of the tool head and mould sections during a complete moulding cycle. In each of these Figures a portion of the L-shaped arm 301 is shown with the center plate 201 attached thereto and projecting therefrom. The unload plate 202 and load plate 203 are illustrated spaced from the center plate 201 or in engagement with the center plate 201 as the case may be for the different stage of the cycle as represented by the respective FIGS. 10 to 15.

Projecting from face 213 of the unload plate 202 are a plurality of ejector guide fingers 225. These guide fingers are located below each one of the respective moulded articles as is clearly illustrated in FIG. 9. Also projecting from face 213 of the unload plate is a plurality of electromagnets designated respectively EM1', EM2', EM3', EM4', EM5', EM6', EM7' and EM8'. These magnets are suitably located for contact with the metal portion 11 of the seat belt tongue 10 (see FIGS. 7 and 9).

Figure 16:
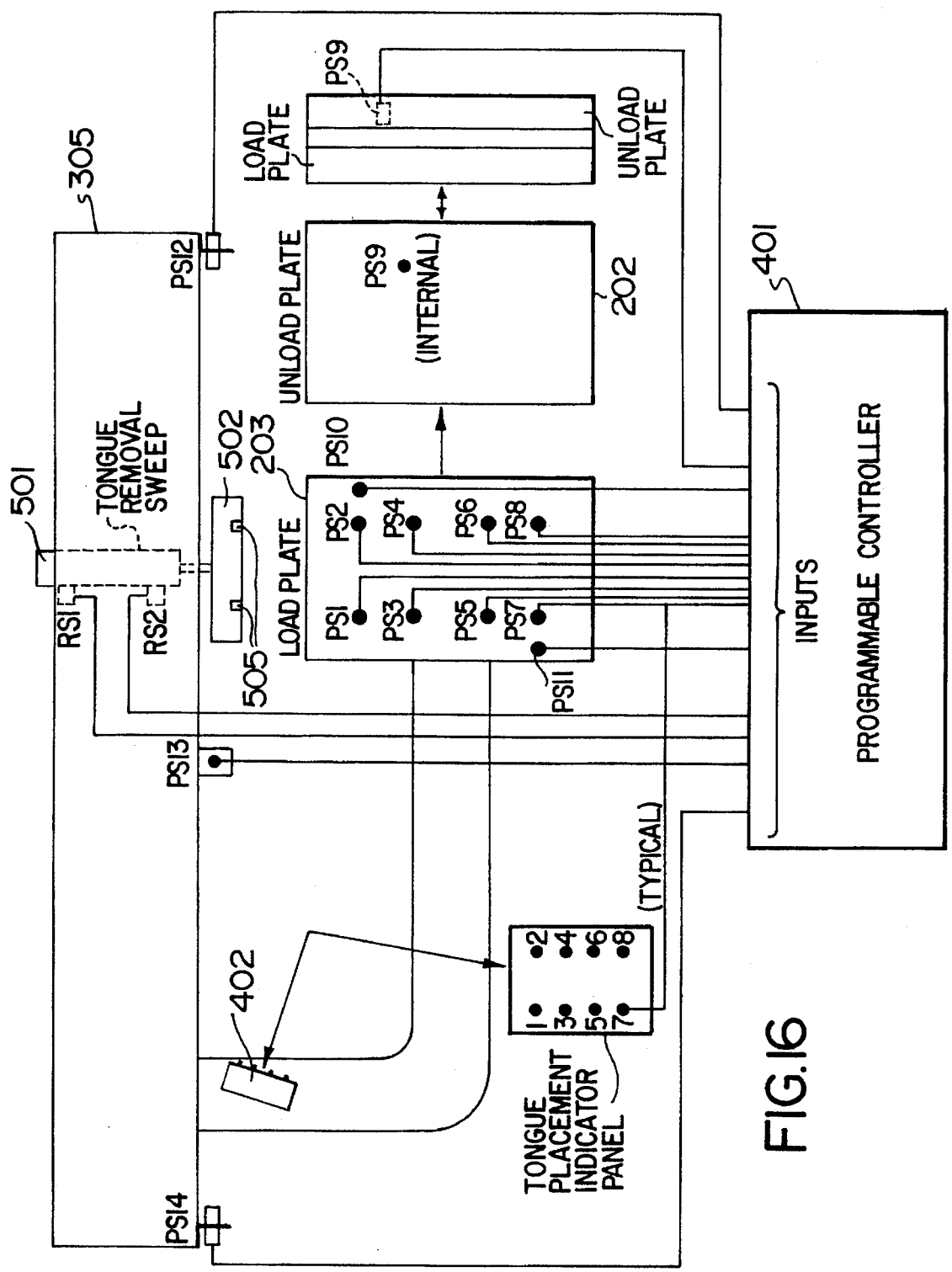
FIG. 16 is a schematic illustrating schematically and diagrammatically the moulding system and controls of the present invention.

Internally of the unload plates 202 there is a proximity sensor PS9 (see FIG. 16). Further proximity sensors PS10 and PS11 are located on the load plate. On the beam there are a pair of spaced apart proximity sensors designated respectively PS12 and PS14. Intermediate this there is a further proximity sensor designated PS13. The control system 400 includes a programmable controller 401 having inputs for the connection thereto of output signals provided by the various sensors.

Mounted on the arm 301 is a tongue placement indicator panel 402 which as shown in FIG. 16 has a face with designations 1 to 8 inclusive representing 8 individual elements which will illuminate providing a visual indication for each of the respective different tongue pieces on the load plate. Should any one of the load plates not meet specification the appropriate bulb or other visual indicating means will be activated. The positions 1 to 8 with reference to FIG. 8 correspond to the positions of the metal plates 11 retained by respective electromagnets EM1 to EM8. The visual indicating means are activated by signals from the respective sensors PS1 to PS8.

Before describing the complete cycle as illustrated in FIGS. 10 to 15 attention is directed to FIGS. 3, 4, 5 and 16 which illustrate apparatus 500 for removing the moulded tongues from the face 213 of unload plate 202. The apparatus 500 basically includes a pneumatic piston cylinder unit 501 that has a sweep bar 502 attached to the end of the piston rod 503. The sweep is preferably a flexible rubber like member with a pair of notches 505. These notches align with the projecting guide fingers 225 and electromagnets that also project from the unload face 213. The bar 507 accordingly can sweep across the face 213 by extension of the piston rod downwardly as for example viewed in FIG. 3. This downward movement strips the moulded articles from the face of the tool head which have not fallen by gravity after deactivation of electromagnets EM1' to EM8'.

The apparatus 500 may be provided with guide bars 508. These bars provide a slide for a head piece 510 attached to the piston rod and having the sweep 502 attached thereto.

Figure 5:
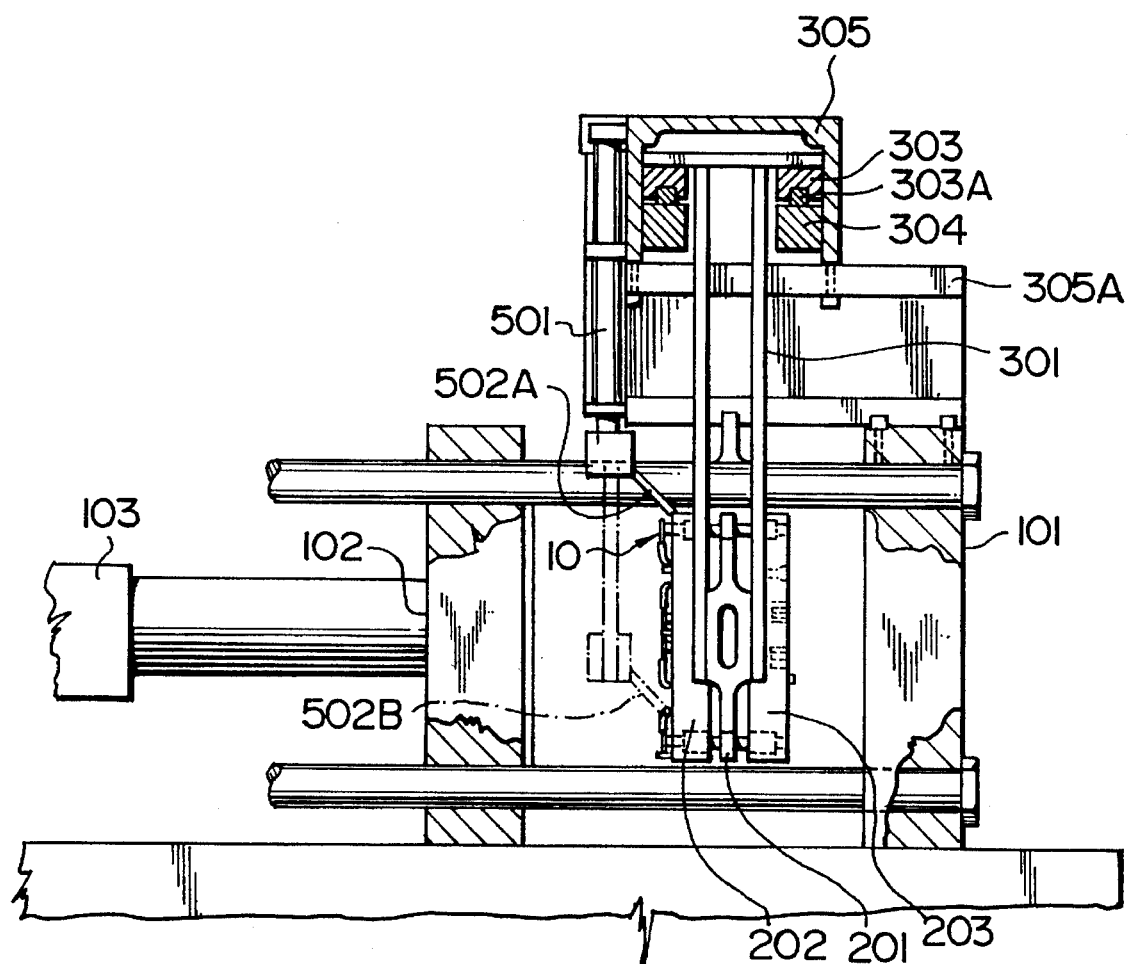
FIG. 5 is a view taken essentially along line 5—5 of FIG. 4.

FIG. 5 illustrates the sweep bar 502 in each of its two extreme positions, one being at the top and the other at the bottom, these being designated in FIG. 5 respectively by reference numerals 502A and 502B. These extreme limits are determined by the location of space bar limit reed sensors RS1 and RS2 (see FIG. 16).

Referring now to FIGS. 10 to 15 in FIG. 10 the system is in the moulding cycle. The tool head is in a location designated position 1 where it is remote from the moulding machine. The unload plate 202 and the load plate 203 are shown in their extended position, i.e. spaced outwardly from the center plate 201. The moulding machine as previously described comprises the fixed mould section 101 and the movable mould section 102. The fixed mould section 101 is shown attached to a fixed platen 101A while the movable mould section 102 is shown attached to the movable mould platen 102A. Members 102B are guide bars along which the platen 102A slides back and forth as indicated by the arrow A in FIG. 10, such movement being controlled by the previously described actuator 103.

In FIG. 11, 8 eight steel inserts 11 are loaded onto the face 212 of load plate 203. The respective inserts are held in place by activated electromagnets EM1 to EM8. Each insert is checked for flatness by the proximity sensor PS1 to PS8 associated therewith which also checks the location of the respective inserts. When the last insert is in the correct location the last sensor signals plates 202 and 203 to close. In the closed position the plates are in contact with the center plate 201. The internal sensor PS9 between the two plates checks to make sure the plates are closed. If the plates are not closed the tool head will not advance to position 2, such position being the subject of FIGS. 12, 13 and 14. All sensors are connected to the programmable controller 401 which is interconnected with the computer controller of the moulding machine all of which in the present application is generically represented in FIG. 1 as the control system 400.

Figure 12:
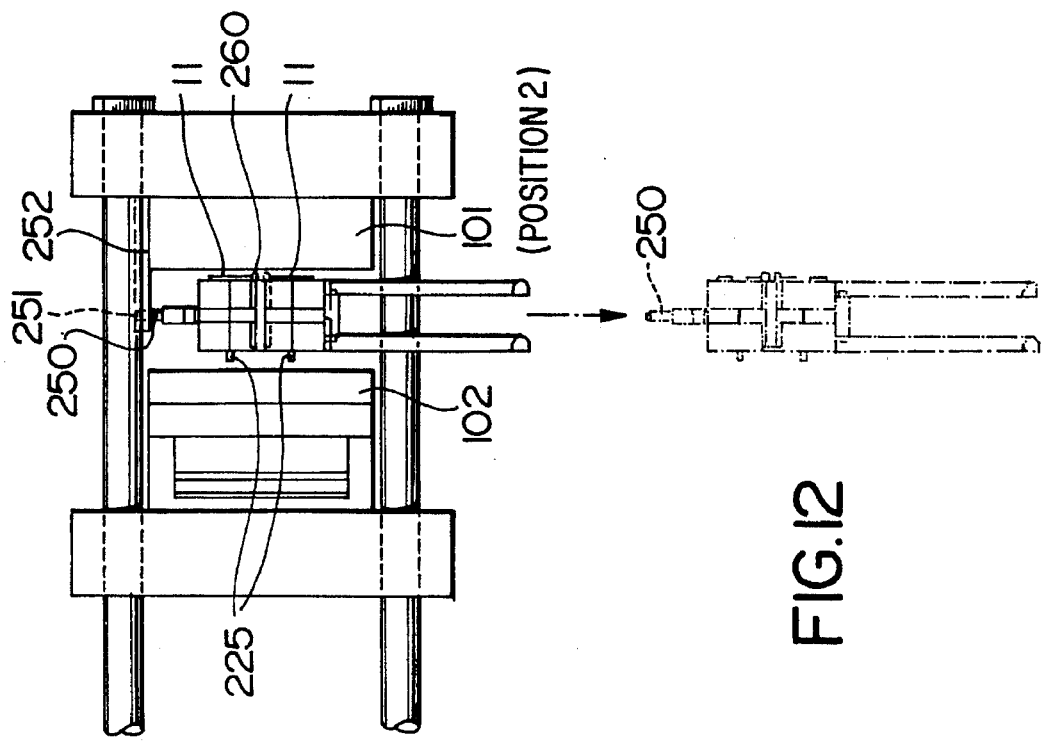

In FIG. 12 the mould is opened and the tool head moved forward to position 2 wherein it is located between the respective mould sections 101 and 102. In the final phase of the movement pin 250 projects into a recess or hole 251 in the fixed bar 252 and thereby positively locating the tool head relative to the fixed mould section.

Referring to FIGS. 12 and 16 sensor PS12 detects when the tooling head is in position 2 and signals plates 202, 203 to move away from one another. The load plate 203 contacts the mould section 101 and pushes inserts 11 into the cavity of mould section 101. The unload plate 202 extends until ejector guide fingers 225 touch the movable mould section 102. These guide fingers 225 maintain a set predetermined distance from the mould section 102 to the unload plate 202. Sensors PS10 and PS11 in the load plate 203 detect when the inserts 11 are located and signals the machine to eject the moulded parts 10 onto the unload plate 202. The ejector guide fingers 225 not only provide the aforementioned spacing but also support the moulded parts 10 until they reach the electromagnets on the face 213 of the unload plate 202. The load electromagnets EM1 to EM8 switch off and the unload magnets EM1' to EM8' switch on.

Figure 14:
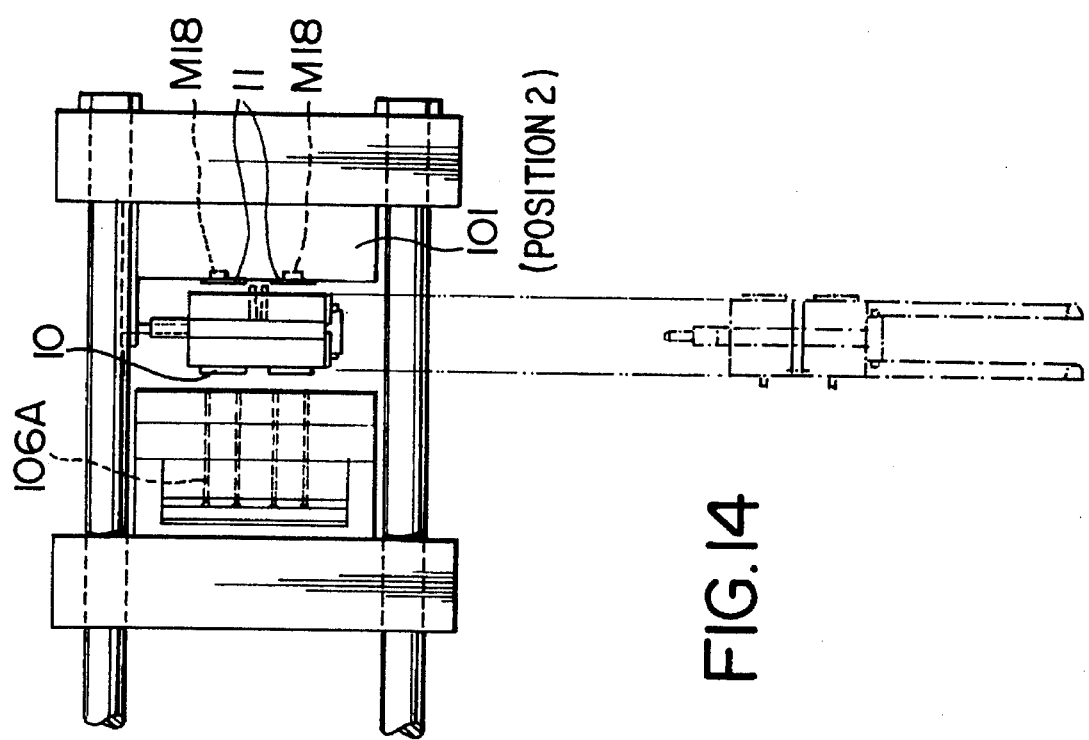

FIG. 14 shows the unload plate 202 and load plate 203 retracted, i.e. the three plates are sandwiched together, inserts 11 having been left behind and are held by magnets M18 in the fixed mould section 101. At the same time as leaving behind the inserts 11 on mould section 101 the moulded articles 10 have been pushed away by push rods 106A associated with actuator 106. The moulded parts 10 are retained on the face of the unload mould plate 202 by the electromagnets EM1' to EM8'.

Figure 15:
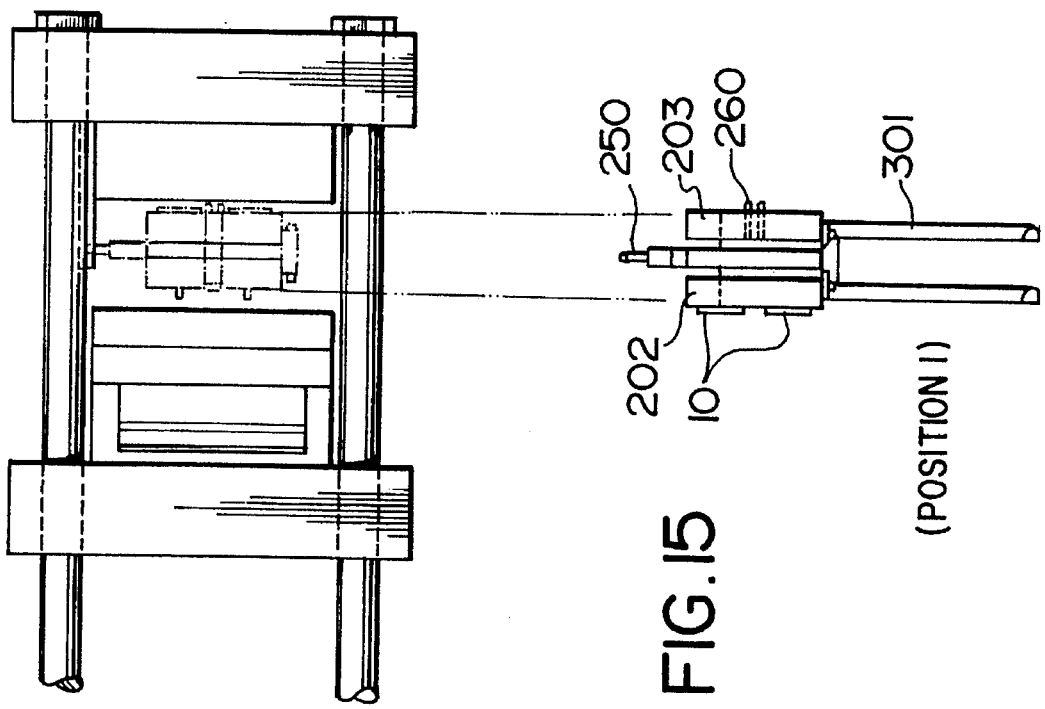

Referring to FIG. 15 the internal sensor PS9 between plates 202 and 203 is activated when the plates close signalling the head tool to move back to its position 1. When the head tool clears the mould it passes sensor PS13 and moulding begins as the head continues back all the way to position 1. Sensor PS14 signals plates 202 and 203 to extend and electromagnets EM1' to EM8' switch off and air cylinder 501 pushes sweep 502 down across face 213 of plate 202. The sweeping ensures that all moulded parts 10 are unloaded and completes the full cycle which takes one back to FIG. 10.

Figure 3:
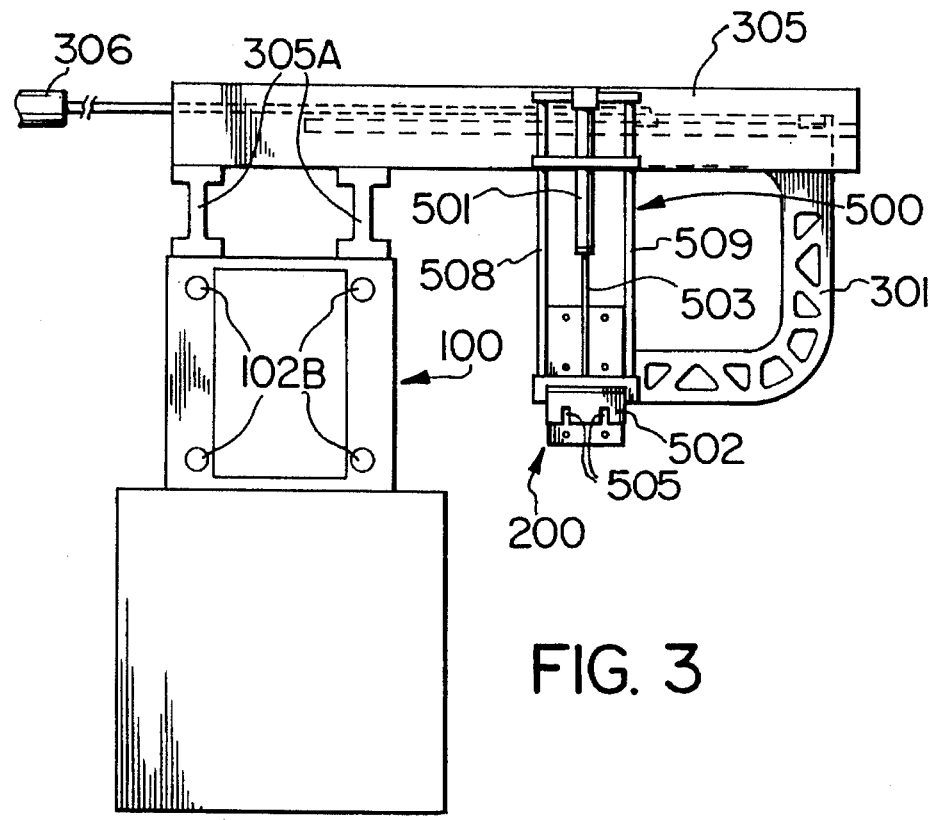
FIG. 3 is a left hand side elevational view of the system of FIG. 1 but illustrating further detail.
Figure 4:
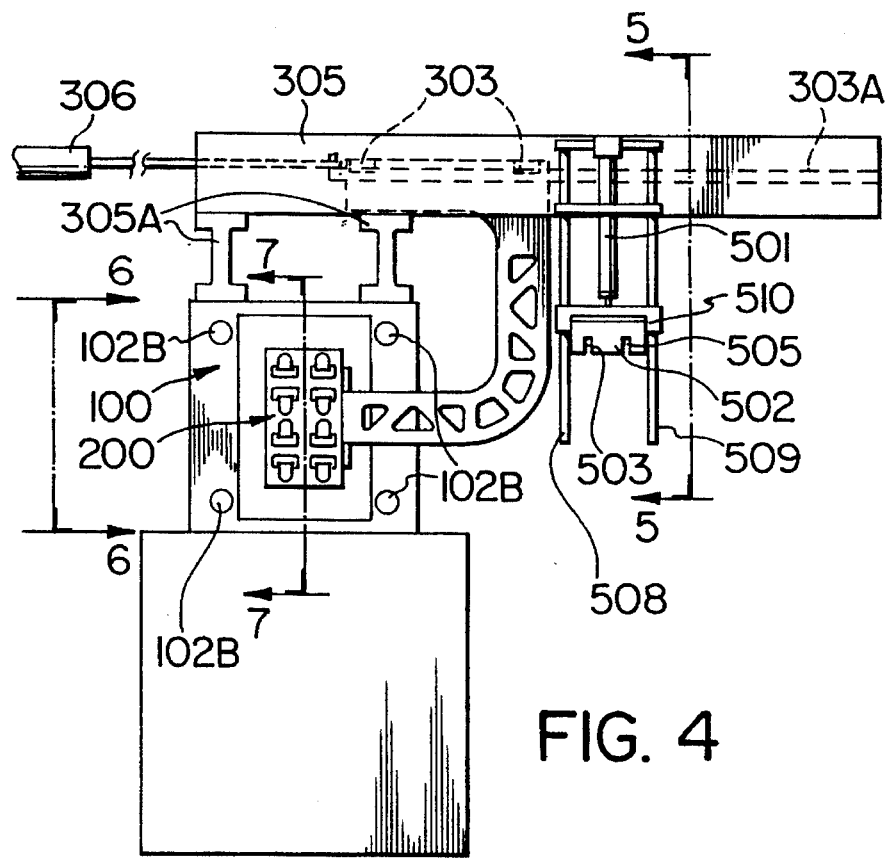
FIG. 4 is the same as FIG. 3 but with the tool head moved to a position between the open mould and with the movable mould section removed for clarity of illustration.

The main spar or beam 305 and unload sweep mechanism 500 are shown in FIGS. 3, 4 and 5 with FIG. 4 illustrating the sweep mechanism in its upper position. FIG. 3 shows the sweep mechanism in its down position with the moulded parts 10 removed and FIG. 5 illustrates both positions and as previously indicated these are designated 502A and 502B.

The control system 400 automates the entire system for high speed production. Accuracy of positioning of the metal inserts 11 is further ensured by one or more pins 260 projecting from face 212 of the load plate and which project into a recess in the mould section 101 when the head is properly located.

The insert moulding system is automated by the control system 400 and variously positioned sensors. Included in the control system are the following:

| CONTROL PANEL SWITCHES | |
| --- | --- |
| Switch #1 | Emergency stop |
| Switch #2 | Power on/off |
| Switch #3 | Manual/auto cycle |
| Switch #4 | Unload magnets on - manual cycle |
| | All magnets off - manual and auto cycle |
| Switch #5 | Load/unload plates extend/retract - manual cycle |
| Switch #6 | Arm advance/retract - manual cycle |
| RELAYS | |
| Relay #1 | Ejectors extend, retract |
| Relays #2, #2A | Clamp close block |
| Relay #3 | Load magnets, unload magnets |
| Relays #4, #5 | Safety light curtain |
| Relays #6, #7, #8 | Drop out detection system |
| AIR VALVES | |
| Air valve #1 | Load/unload plates extend/retract |
| Air valve #2 | Arm advance/retract |
| Air valve #3 | Tongue removal sweep |
| POWER SUPPLIES | |
| Power supply A | Omron S82K-0524 24 V dc output - power for valves, proximity sensors, relays, load magnets. |
| Power supply B | Omron S82K-0312 12 V dc output - power for unload magnets. |
| Power supply C | Omron S82J-0224 24 V dc output - power for safety light curtain. |
| Power supply D | Omron S82J-0224 24 V dc output - power for drop out detection infrared scanners. |
| LIMIT SWITCHES | |
| Limit switch #1 | Interlock to ensure that arm cannot be advanced in manual cycle unless load/unload plates are retracted. |
| REED SWITCHES | |
| Reed switch #1 (RS1) | Sweep in up position |
| Reed switch #2 (RS2) | Sweep in down position |
| PLC INPUTS - BIT ADDRESSES | |
| Switch 3 (SW3) Auto Cycle | Address 0020 |
| Proximity sensor #1 (PS1) | Tongue placement position 1 - Address 00201 |
| Proximity sensor #2 (PS2) | Tongue placement position 2 - Address 00202 |
| Proximity sensor #3 (PS3) | Tongue placement position 3 - Address 00203 |
| Proximity sensor #4 (PS4) | Tongue placement position 4 - Address 00204 |
| Proximity sensor #5 (PS5) | Tongue placement position 5 - Address 00205 |
| Proximity sensor #6 (PS6) | Tongue placement position 6 - Address 00206 |
| Proximity sensor #7 (PS7) | Tongue placement |

-continued

| | |
|---|---|
| Proximity sensor #8 (PS8) | Tongue placement position 7 - Address 00207 |
| Proximity sensor #8 (PS8) | Tongue placement position 8 - Address 00208 |
| Proximity sensor #9 (PS9) | Load/unload plates retracted - Address 00209 |
| Proximity sensor #10 (PS10) | Load/unload plates positioned against mould face, load magnets off/unload magnets on, delay ejector forward - Address 00210 |
| Proximity sensor #11 (PS11) | Load/unload plates positioned against mould face, load magnets off/unload magnets on, delay ejector forward - Address 00211 |
| Proximity sensor #12 (PS12) | Arm at load/unload position, delay extend plates, activate drop out detection - Address 00212 |
| Proximity sensor #13 (PS13) | Release clamp block, pulse clamp, de-activate drop out detection - Address 00213 |
| Proximity sensor #14 (PS14) | Arm fully retracted (home position) - Address 00214 |
| Reed switch #1 (RS1) | Sweep in retracted (up) position - Address 00215 |
| Reed switch #2 (RS2) | Sweep in extended (down) position - Address 00004 |
| Input #1 | Ejectors forward - Address 00002 |
| Input #2 | Ejectors retract - Address 00003 |

PLC OUTPUTS

| | |
|---|---|
| Auto Cycle | Output 1000 |
| Retract load/unload plates | Outputs 00300, 00305 |
| Extend load/unload plates | Outputs 00303, 00307 |
| Arm advance | Output 00301 |
| Arm retract | Output 00306 |
| Block clamp | Output 00302 |
| Release clamp block | Output 00104 |
| Activate drop out detection | Output 00103 |
| Load magnets off, unload magnets on | Output 00304 |
| Advance ejectors | Output 00100 |
| Retract ejectors | Output 00101 |
| Pulse clamp close (moulding cycle start) | Output 00102 |
| Sweep activate | Output 00308 |

PLC TIMERS

| | |
|---|---|
| Timer #1 (T001) | Delay load/unload plates retract for 1 second |
| Timer #2 (T002) | Delay extend plates for .5 seconds |
| Timer #3 (T003) | Delay ejector advance for .5 seconds |
| Timer #4 (T002) | Delay sweep down travel for 2 seconds |

DIFFERENTIATION

| | |
|---|---|
| DIFU 01100 | Turns output 00308 (sweep activate) on for a single scan. |

The start conditions for the robot in automatic cycle are as follows:

(a) the arm 301 is fully retracted
(b) the load 203/unload 202 plates are extended
(c) selector switch #4 is in neutral position
(d) the emergency switch—switch #1 is off
(e) the power switch—switch #2 is on
(f) the manual/auto switch—switch #3 is set to auto
(g) the tongue removal sweep is in the up position

OPERATION:

As metal tongues are placed in position (1–8) on the load plate, they are held on the plate by respective ones of the electromagnets EM1 to EM8 associated therewith. The correct placement of each tongue is confirmed by a respective one of the proximity sensors PS1 to PS8. If any one of the tongues is placed correctly, a corresponding light illuminates on the Tongue Placement Indicator Panel 402.

When all 8 tongues have been placed correctly on the plate, timer #1 (T001) in the PLC turns on for 1 second. Upon completion of the timing cycle, the load/unload plates retract. The retraction of the plates is verified by the proximity sensor PS9.

When the mould opens, the Ejector Forward signal from the moulding machine computer is routed to the PLC (input #1). Input #1 causes 2 functions to occur simultaneously:

(1) Output #301 in the PLC turns on, energizing solenoid 2A, causing the arm to travel forward into the moulding area.

(2) Output #302 in the PLC turns on and latches, energizing relays #2 and #2A which block the signal to the moulding machine solenoid 4010B—clamp close. This function is a safety feature to protect the robot while it is in the moulding area.

When the arm has travelled forward to the correct position to load/unload, proximity switch PS12 is activated. The activation of PS12 causes 2 functions to occur simultaneously:

(1) Timer #2 (T002) in the PLC turns on for 0.5 seconds. Upon completion of the timing cycle output #303 in the PLC turns on, energizing solenoid 1A to extend via pneumatic units 204 the load/unload plates. The 0.5 second delay in extending the load/unload plates is to ensure that the arm is in the correct forward position.

(2) Output #103 in the PLC turns on and holds in, activating a Drop Out Detection Scanning System.

When the plates are fully extended, proximity switches PS10, PS11 in the load plate verify that the load plate is against the face of the stationary half 101 of the mould. The activation of PS10 and PS11 causes 2 operations to occur simultaneously:

(1) Output #304 in the PLC turns on and latches, energizing relay #3 which turns off the load plate magnets EM1 to EM8 and turns on the unload plate magnets EM1' to EM8'. The metal tongues are now held in position in the mould by magnets M18 in the cavities.

(2) Timer #3 (T003) in the PLC turns on for 0.5 seconds. Upon completion of the timing cycle, output #100 in the PLC turns on, allowing the Ejector Forward signal from the moulding machine computer to reach solenoid 4020A in the machine. The ejectors advance, pushing the moulded parts on to the unload plate 203 where they are held by the electromagnets EM1' to EM8'. The 0.5 second delay in advancing the ejectors is to ensure that the unload plate is fully extended to its correct position.

After the ejectors have reached their forward position, the Ejector Retract signal from the moulding machine computer is routed to the PLC (input #2). Input #2 causes 2 functions to occur simultaneously:

(1) Output #305 in the PLC turns on, energizing solenoid 1B, causing the load/unload plates 203, 202 to retract.

(2) Output #101 in the PLC turns on allowing the Ejector Retract signal from the moulding machine computer to reach solenoid 4020B in the machine. The ejectors retract.

Proximity switch #9 (PS9) verifies that the plates have retracted, and turns on output #306 in the PLC. Output #306 energizes solenoid 2B, causing the arm to retract from the moulding area.

As the arm is retracting, it passes by proximity switch #13 (PS13), activating it momentarily. This momentary activation causes 3 functions to occur simultaneously:

(1) Output #103 in the PLC turns off, deactivating the Drop Out Detection Scanning System.

(2) The latch on output #302 is broken, de-energizing relays #2 and #2A. The link between terminals 30 and 31 in the moulding machine is re-established, allowing the clamp close signal from the moulding machine computer to reach solenoid 4010B in the machine—clamp close.

(3) Output #102 in the PLC turns on and holds in, applying a 24 v. signal to input #E000 in the moulding machine computer. This signal causes the moulding cycle to start.

When the arm has fully retracted (starting position), its position is detected by proximity sensor #14 (PS14). The activation of PS14 causes 4 functions to occur:

(1) Output #102 in the PLC turns off, removing the 24 v. signal to input #E000 in the moulding machine.

(2) Output #307 in the PLC turns on, energizing solenoid 1A, causing the load/unload plates to extend.

(3) The latch on output #304 is broken, de-energizing relay #3. The magnets on the load plate turn on and the magnets on the unload plate turn off.

(4) Timer #4 (T004) is activated. After 2 seconds, PLC output #308 turns on, activating air valve #3 solenoid causing the Tongue Removal Sweep to move down the face of the unload plate. When the Sweep reaches the bottom of the plate, Reed Switch #2 (RS2) turns off output #308, causing the Sweep to return to its starting (up) position.

End of cycle and repeats for automatic cycling of precision insert moulding.

We claim:

1. An insert moulding system comprising:

(a) an injection moulding apparatus having a pair of relatively movable mould sections which, in an open position, are spaced apart from one another and in a closed position define therebetween a cavity for moulding;

(b) an insert and moulded article transport system comprising a tool head, means movably mounting said tool head to move the tool head from one position to the other of first and second positions located respectively remote from the mould sections when the mould sections are in their closed position and between the mould sections when the mould sections are in their open position, said tool head having respective load and unload faces on opposite sides thereof, and means on said tool head to retain at least one moulding insert piece on said load face; and (c) control means automating loading of said at least one insert piece, which is on said tool head, into the open mould by said tool head, said control means including sensing means on said tool head sensing at least one characteristic of each respective insert piece thereon and generating a signal output in response to such sensed characteristic being outside of specification, and means operative in response to said generated signal rendering inoperative the moulding process until the offending insert piece is replaced by one meeting specification and thereby providing for precision insert moulding.

2. A moulding system as defined in claim 1 including a rigid support structure for said mould sections, means fixedly mounting one of said pairs of mould sections on said support structure and means movably mounting the other one of said mould sections for movement along a selected path toward and away from said one mould section.

3. A moulding system as defined in claim 2 including spaced apart projections extending outwardly from said load face, said projections providing at least part of said insert retaining means.

4. A moulding system as defined in claim 2 including electromagnets on said tool head, said electromagnets providing at least part of said insert retaining means.

5. A moulding system as defined in claim 2 including spaced apart projections extending outwardly from said load face and electromagnets on said tool head, said projections and electromagnets providing said insert retaining means.

6. A moulding system as defined in claim 5 wherein there is a set of spaced apart projections for each insert on said load face.

7. A moulding system as defined in claim 6 wherein one projection of each set projects in mating close fit relation into an aperture in the insert associated therewith.

8. A moulding system as defined in claim 2 including a load plate on one side of said tool head, means mounting said load plate on said tool head for movement toward and away therefrom along a predetermined path and wherein said load face comprises an outer surface on said load plate.

9. A moulding system as defined in claim 8 including an unload plate on said tool head, said load and unload plates being disposed respectively on opposite sides of said tool head.

10. A moulding system as defined in claim 2 wherein said tool head comprises a center plate, an unload plate and a load plate, said load and unload plates being disposed respectively on opposite sides of said center plate, means mounting said load and unload plates on said center plate for reciprocal movement toward and away therefrom along a predetermined path and power means on said tool head for moving said load and unload plates.

11. A moulding system as defined in claim 10 wherein said power means interconnects said load and unload plates for selectively moving one relative to the other selectively in directions toward and away from one another.

12. A moulding system as defined in claim 11 wherein said load and unload plates are mounted in free floating movement relation with respect to said center plate.

13. A moulding system as defined in claim 12 wherein said load and unload plate mounting means comprises a pair of pins each secured to and projecting respectively from opposite sides of said center plate and wherein said load and unload plates are each slidably mounted on said pins.

14. An insert moulding system as defined in claim 2 wherein said means movably mounting said tool head comprises a beam structure, carriage means movably mounted on said beam, means to reciprocally move said carriage means, back and forth relative to said beam and an arm carried by said carriage means and projecting therefrom, said tool head comprising a fixed center plate rigidly secured to said arm, a load plate, means movably mounting said load plate on said center plate, an unload plate, means movably mounting said unload plate on said center plate, said load and unload plates being disposed respectively in opposite sides of said load plate, power means connected to said load and unload plates to move the same toward and away from one another respectively into abutting and spaced relation with respect to said center plate.

15. The moulding system as defined in claim 14 wherein said sensing means comprises a proximity sensor on said load plate and wherein there is one such proximity sensor for each insert piece placed in said load plate.

16. An insert moulding apparatus comprising:
   (a) an injection moulding apparatus having a pair of mould sections, a rigid mounting structure, means fixedly securing one of said mould sections to said mounting structure, means movably mounting said other mould section on said mounting structure, said mould sections having an open position in which they are spaced apart from one another onto the other of said mould sections, and a closed position defining therebetween a cavity for moulding;
   (b) an insert and moulded article transport system comprising a tool head, means movably mounting said tool head for movement along a predetermined path from one position to the other of first and second positions respectively remote from the mould sections when the mould sections are in their closed position and between the mould sections when the mould sections are in their open position, said tool head having respective load and unload faces on opposite sides thereof, insert position and retaining means on said tool head providing a predetermined location on said load face for at least one insert and releasably retaining the same to be incorporated in a moulded article; sensor means on said tool head responsive to a predetermined selected characteristic of an insert retained on said load; and
   (c) tool head guide and locating means including first and second portions respectively on said tool head and a structure fixed relative to said fixed mould section, said first and second portions being inter-engageable and located such as to positively locate the load face of the tool head in a predetermined position relative to a cavity in said fixed mould section.

17. An insert moulding apparatus as defined in claim 16 wherein said tool head guide and locating means comprises a projection on one or the other of the tool head and rigid fixed structure and a recess on the other for receiving said projection.

18. An insert moulding apparatus as defined in claim 17 including a load plate on one side of said tool head, means mounting said load plate on said tool head for movement toward and away therefrom along a predetermined path and wherein said load face comprises an outer surface on said load plate.

19. An insert moulding apparatus as defined in claim 18 including an unload plate on said tool head, said load and unload plates being disposed respectively on opposite sides of said tool head.

20. An insert moulding apparatus as defined in claim 19, wherein said tool head movement from said first to said second position is along a path which is transverse to said predetermined path of the load plate, wherein said tool head guide and locating means comprises a first projection and recess means which mate with one another upon final movement of said tool head to said second position and a second projection and recess means which mate with one another upon movement of said load plate toward said fixed mould section.

21. An insert moulding apparatus as defined in claim 16 wherein said tool head comprises a center plate, an unload plate and a load plate, said load and unload plates being disposed respectively on opposite sides of said center plate, means mounting said load and unload plates on said center plate for reciprocal movement toward and away therefrom along a predetermined path and power means on said tool head for moving said load and unload plates.

22. An insert moulding apparatus as defined in claim 21 including pins means projecting from said load plate and correspondingly positioned recesses on said fixed mould section to receive such pins upon movement of said load plate into engagement with said fixed mould.

23. An insert moulding apparatus as defined in claim 22 including spacer pin means projecting from said unload plate to engage said movable mould section and provide a predetermined spaced relation therebetween.

24. An insert moulding apparatus comprising:
   (a) an injection moulding machine having a pair of mould sections, one of said mould sections being fixed on a rigid support structure and the other mould section being reciprocally mounted for movement toward and away from said on mould section, said mould sections having an open position in which they are spaced apart from one another and a closed position in which they abut against each other and define therebetween a cavity for moulding;
   (b) a rigid rail member mounted on said support structure;
   (c) a carriage mounted on said rail for reciprocal movement thereon;
   (d) power means to move said carriage;
   (e) an arm member secured to and projecting from said carriage, said arm having a free outer end;
   (f) a tool head secured to said arm and projecting from the free outer end thereof and wherein reciprocal movement of said carriage causes said tool head to move from one position to the other of first and second positions located respectively remote from the mould sections when the mould sections are in their closed position and between the mould sections when the mould sections are in their open position, said tool head having a center plate secured to said arm, a load plate and an unload plate disposed respectively on opposite sides of said centre plate, means mounting said load and unload plates on said center plate for movement toward and away therefrom, power means interconnecting said load and unload plates selectively to move them toward and away from one another, said load plate and unload plate having respective load and unload faces on opposite outer faces of the tool head, a plurality of proximity sensor means on said load face and spaced apart from one another, and insert location defining means for retaining an insert on said load face at each of said proximity sensors and in overlying relation therewith, electromagnetic means on said load plate for releasably retaining each insert thereon to be incorporated in a moulded article; and (g) tool head guide and locating means including first and second arrangements each having first and second portions respectively on said tool head and fixed rigid structure, said first and second portions in each of the respective arrangements being inter-engageable and located such as to positively locate the load face of the tool head in a predetermined position relative to a cavity in said fixed mould section.

* * * * *